US006654457B1

(12) United States Patent
Beddus et al.

(10) Patent No.: US 6,654,457 B1
(45) Date of Patent: Nov. 25, 2003

(54) CALL CENTRE

(75) Inventors: Simon Alexander Beddus, Suffolk (GB); Fenela Wills, Suffolk (GB); David Mark Fisher, Suffolk (GB); David Wells, Norwich (GB)

(73) Assignee: British Telecommunications, London (GB)

( * ) Notice: Subject to any disclaimer, the term of this patent is extended or adjusted under 35 U.S.C. 154(b) by 0 days.

(21) Appl. No.: 09/600,120

(22) PCT Filed: Jan. 8, 1999

(86) PCT No.: PCT/GB99/00057

§ 371 (c)(1),
(2), (4) Date: Jul. 12, 2000

(87) PCT Pub. No.: WO99/40712

PCT Pub. Date: Aug. 12, 1999

(30) Foreign Application Priority Data

Feb. 5, 1998 (GB) ............................................ 9802547

(51) Int. Cl.[7] ......................... H04M 3/00; H04M 5/00; H04M 3/42

(52) U.S. Cl. ........................... 379/265.02; 379/265.09; 379/210.01

(58) Field of Search ....................... 379/265.01–265.14, 379/266.01–266.09, 266.1, 309, 201.02–201.05, 207.02, 210.01, 211.01, 211.02; 370/352–356, 401, 493

(56) References Cited

U.S. PATENT DOCUMENTS 5,537,470 A * 7/1996 Lee ....................... 379/142.06
5,884,032 A * 3/1999 Bateman et al. ............ 370/356
5,907,547 A * 5/1999 Foladare et al. ............ 370/352
6,064,730 A * 5/2000 Ginsberg ............... 379/265.09
6,295,551 B1 * 9/2001 Roberts et al. ............. 709/203
6,385,191 B1 * 5/2002 Coffman et al. ............ 370/352

FOREIGN PATENT DOCUMENTS

EP 0 740 445 A2 10/1996
WO 97/28635 8/1997
WO 97/50235 12/1997
WO 98/20667 5/1998

OTHER PUBLICATIONS

Lautenbacher M E et al; "Intelligent Internet; Value–Added Services by Interworking Between Network Technologies" ISS '97 World Telecommunications Congress. (International Switchin Symposium), Global Network Evolution: Convergence or Collision? Toronto, Sep. 1997, pp. 45–51 Abdallah Abi–Aad et al., see paragraph 3.1.

* cited by examiner

*Primary Examiner*—Benny Tieu
(74) *Attorney, Agent, or Firm*—Nixon & Vanderhye, PC

(57) ABSTRACT

In a call centre connected via a network to a number of terminals, at least part of a process of automatic call distribution (ACD) is carried out at the terminals.

6 Claims, 7 Drawing Sheets

BRI= BASIC RATE ISDN

PRI= PRIMARY RATE ISDN

DPNSS= DIGITAL PRIVATE NETWORK SIG. SYSTEM

GW= H.323 GATEWAY

CALL CENTRE

BACKGROUND TO THE INVENTION

The present invention relates to a call centre and to a communications network using such a call centre.

Call centres are widely used by commercial organisations, for the handling of incoming calls and/or for initiating calls to customers. Typically, a call centre will have a large number of lines associated with a single number. Calls are received from customers and held in a queue before being directed to the next available agent. Prior to being placed in the queue the customer may indicate, e.g. using DTMF tones, the type of call they are making, and they may be placed in a queue for a specific group of agents depending on the type of call.

It has been recognised that the World Wide Web provides a means for enhancing communication between customers and a call centre. It has been proposed to enable customers to initiate a call from a call centre via a web page. For example, WO97/50235 discloses a system in which a customer enters their phone number on a form in an HTTP page, and then clicks on a "submit" button to request a call from the call centre.

SUMMARY OF THE INVENTION

According to a first aspect of the present invention there is provided a method of operating a communications system comprising a call centre and a plurality of customer terminals connected via a communications network to the call centre, characterised in that at least part of a process of automatic call distribution (ACD) is carried out at a customer terminal.

The term "call centre" as used herein encompasses, as well as conventional PSTN call centres, call centres which distribute calls using data protocols such as H323, and hybrid centres handling both PSTN, Voice over IP and data calls.

The present invention provides a method of operating a call centre which significantly increases the efficiency of use of the capacity of the call centre and of the associated network. This is achieved by shifting at least part of the process of automatic call distribution, that is the process whereby a call is assigned to a particular one of the agents, from the call centre to the customer terminal. Then instead of lines being tied up with queuing customers, the setting up of a call may be delayed until an agent is available.

Preferably the method comprises a) communicating ACD (automatic call distribution) data to a customer terminal;

b) using the ACD data selecting at the customer terminal an agent group; and c) subsequently establishing a call from a customer terminal via the call centre to an agent in the group selected in step (b).

Automatic call distribution data is data which identifies, explicitly or implicitly, different groups of call agents, and which in a conventional call centre is processed at the call centre to allocate the next free agent in a selected group. In the present invention, this data is used instead at the customer terminal, so that an agent group, and preferably a specific agent, can be selected prior to the terminal establishing an in-band connection with the call centre.

Preferably the result of the selection made at the customer terminal in step (b) is communicated to the call centre via the communications network. Preferably the communications network is a data network supporting a packet-based internetworking protocol. In the embodiments described below, the data network is the Internet. Preferably the call established in step (c) is also established via the said data network. Alternatively, the call may be established via another network, such as the PSTN (public switched telephony network).

Preferably, step (c) is carried out only when the respective agent is free. Preferably the method includes running a call processing application at the customer terminal and communicating control data for the call processing application from the call centre to the customer terminal.

Preferably the call established in step (c) is set up from the call centre to the customer terminal. Preferably a client application running on the customer terminal returns a network address of the customer terminal on the data network to the call centre, and the call centre establishes a call via the data network to the said address.

The inventors have found it to be particularly advantageous to have calls set up via, e.g., the Internet, from the call centre to the customer terminal, using e.g. the IP address of the customer terminal. The network address will in general be known to any client application running on the customer terminal, and can therefore be made available to the call centre without requiring intervention by the customer. Moreover, functioning in this manner obviates the need for direct interaction between, e.g., a Java ACD applet on the customer terminal and an internet telephony application on the customer terminal, thereby eliminating interworking problems between these applications.

Preferably the method includes setting up a call between the customer terminal and an agent, storing data identifying the said agent, and automatically directing a subsequent call from the customer terminal to the said agent identified in the said stored data.

This preferred feature of the invention makes it possible to overcome the impersonality experienced by the customer when using a conventional call centre. Whereas conventionally if a customer rings a call centre with an enquiry, and then rings back a short time later, they will be connected to a different agent on each occasion, using the present invention is possible to ensure that when they ring back they are connected to the same agent. This is done by storing data recording the identity of the agent who takes the initial call. This is advantageously done using a cookie, that is a data item in a defined format stored on the customer terminal. This cookie is then automatically returned to the call centre when the customer subsequently accesses the call centre web page.

According to a second aspect of the present invention, there is provided a method of operating a communications system comprising a call centre and a plurality of customer terminals connected via a communications network to the call centre, in which automatic call distribution is carried out before a call is setup.

The present invention also encompasses call centres or customer terminals adapted to operate in accordance with the method of the first aspect.

DESCRIPTION OF THE DRAWINGS

Systems embodying the present invention will now be described in further detail, by way of example only, with reference to the accompanying drawings, in which.

DESCRIPTION OF EXAMPLES

Figure 1:
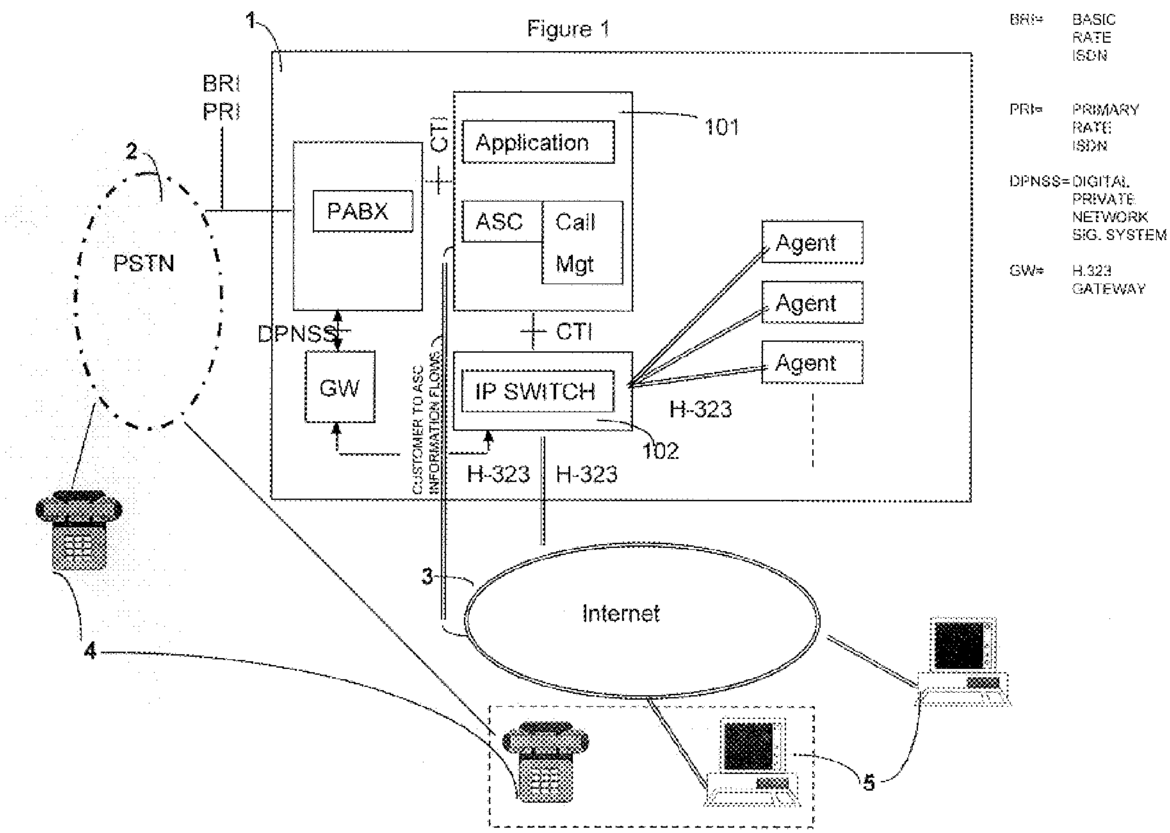
FIG. 1 is a schematic of a communications system embodying the invention.

As shown in FIG. 1, a communications system comprises a call centre 1 connected to first and second communications networks 2,3. In this example, the first network 2 is the PSTN (public switched telephony network) and connects the call centre 1 to customer terminals 4 comprising telephones. The second network 3 is the Internet and connects customer terminals 5 comprising, e.g. personal computers which run an internet telephony client such as Microsoft's NetMeeting (Trade Mark). As shown in the Figure, one of the telephones may be co-located with one of the personal computers, e.g. when the customer has two telephone lines used simultaneously for voice and data respectively.

A first platform 101 in the call centre 1, the telephony platform, runs a call centre application. The call centre application uses resources provided by lower level modules including an agent session component (ASC) module and a call management module. The first platform is connected to a second platform 102 which functions as an IP (internet protocol) telephony switch and connects calls from customer terminals to a selected one of a number of agents. Each agent is implemented using a data terminal and a respective internet telephony client. The agents may be located at the call centre or at respective remote sites. A PABX connects calls from the PSTN 2 e.g. using ISDN to the PABX and using a CTI protocol on the interface to the telephony platform. Traffic from the PSTN is packetised and passed to the agents via an H323 gateway and the IP telephony switch. The H323 protocol, which is a well known protocol used e.g. for multimedia conferencing over internet connections, is also used to connect the agents to the IP telephony switch.

The CTI (computer telephony interfaces) in the call centre may be interfaces using both first party and third party call components, as described and claimed in our co-pending British Patent application number 9800803.0 filed 14.1.98, agent's ref. A25559, the contents of which are incorporated herein by reference.

Figure 2:
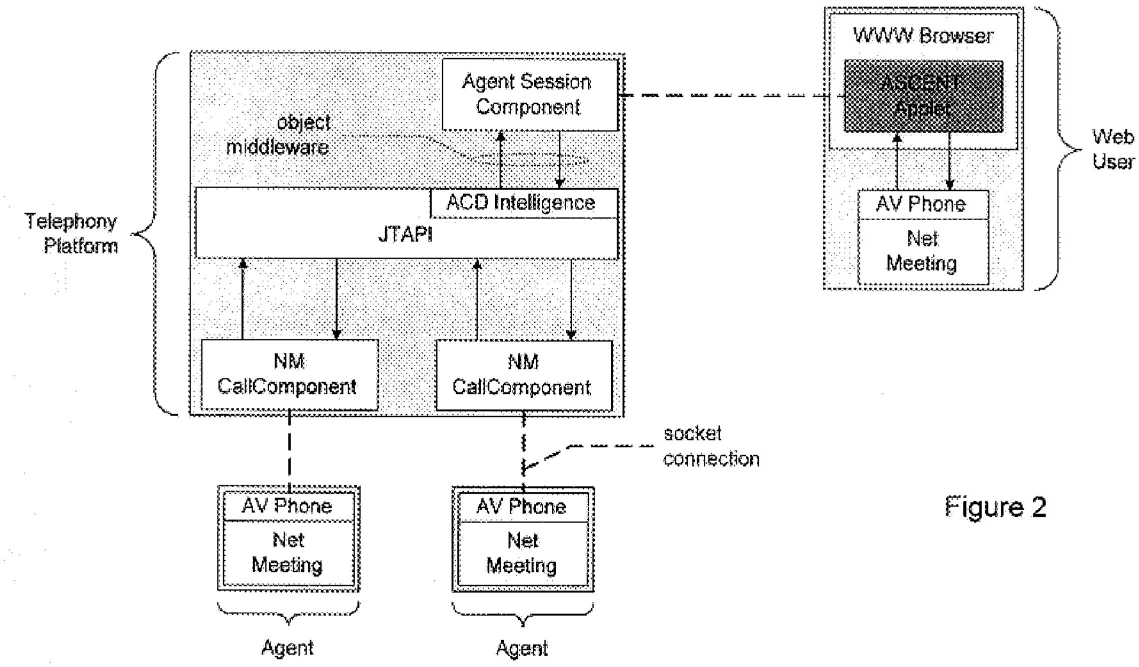
FIG. 2 shows the architecture of the principal components of the system of FIG. 1.
Figure 3:
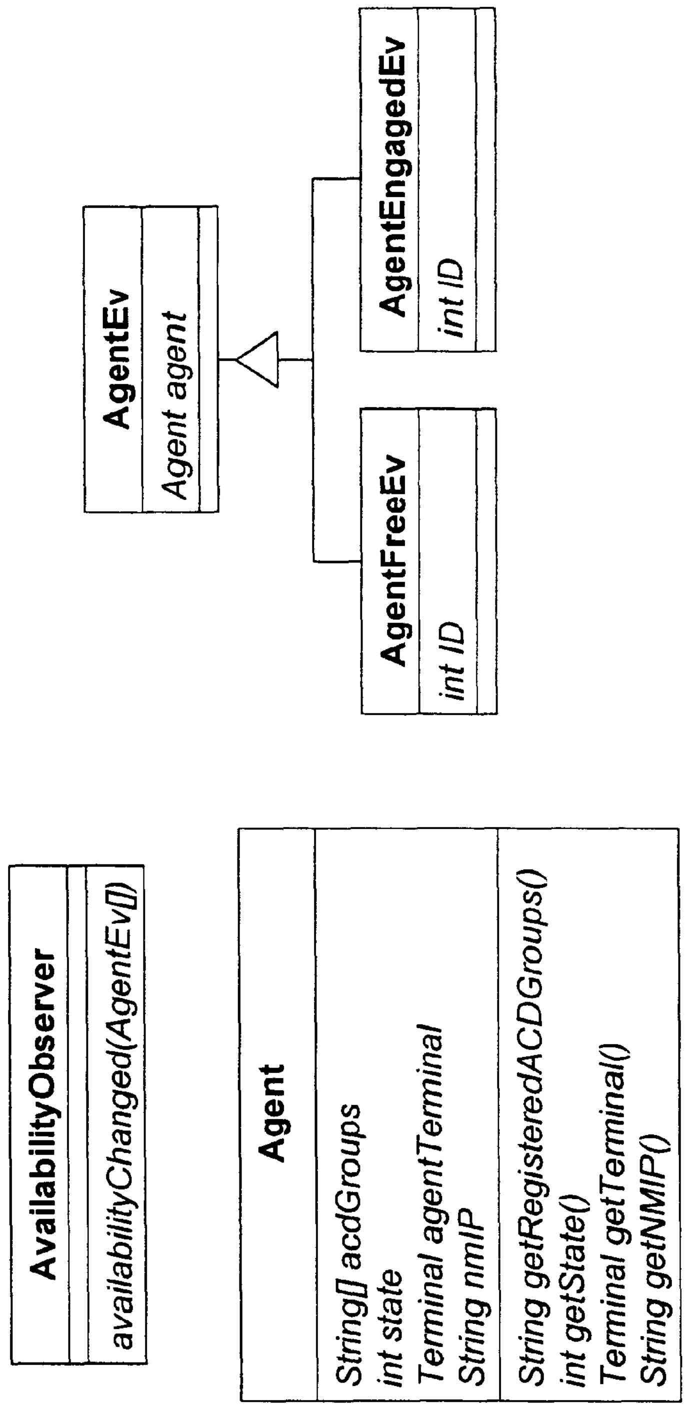
FIG. 3 shows the software objects used to implement the agent session component.

As shown in FIG. 2, users of the customer terminals 5 employ a web browser which addresses the call centre using an appropriate URL and downloads e.g. a Java applet which provides a data interface to the agent session component in the telephony platform. ACD (automatic call distribution) data is communicated from the agent session component to the customer terminal via this data interface. The ACD data communicated to the web browser from the call centre may include the identities of a number of agent groups (e.g. "technical", "marketing", "sales") and the status of the corresponding queues. The status information might include, for example, the length of the queue and the expected waiting time in the queue. The agent group identities may be returned as HTTP data and displayed explicitly on the web page. The status data may be returned as variables to the Java applet and are handled appropriately by the applet. Although the status data may be displayed directly on the web page, in a preferred implementation, the status data is used by the Java applet to control the outputting of audio announcements or voice clips.

Optionally, the ACD data may extend to identifying individual agents. For example, a button may be associated with an agent group which, when clicked, displays a list of agent names, together with further buttons for the selection of a particular agent by the customer. Then, when the customer clicks on the "call me" button, their call is only set up when the named agent is free. Alternatively, explicit agent identity data may not be shown to the customer, but when a call is established, the agent identity may be stored, e.g. as a cookie on the customer terminal or alternatively in a cache at the call centre, and a subsequent call within a defined period, e.g. on the same day, may be queued for connection to the same agent.

Although alternatively other client applications may be used to interact with the call centre, for example through the use of a dedicated plug-in client, the use of Java applets is preferred since the applets can run on any Web browser and do not threaten the security of the customer terminal.

The user may initiate a call to the call centre by pressing a "call me" button on the relevant web page. A separate "call me" button may be displayed on the web page for each agent group, or there may be a single call me button on the page and, e.g., radio buttons beside each agent group to indicate the customer's selection. When the customer clicks on the "call me" button, the Java applet returns the unique IP address of the customer terminal for use by the in later IP telephony calls with the call centre. Even before that button is pressed, the applet may return data to the call centre, e.g. when ever the user's mouse is over the button, or whenever a user first selects the relevant web page. This information may subsequently be used for a telemarketing campaign, calling all users that have shown interest in a particular web site. In this way the call centre is provided with useful statistics in the pre-call phase, before a call has been set up, and this information may be used in controlling the queues to call centre agents, and in other logic functions implemented at the call centre. This information may be presented to agent supervisors along with other agent statistics. For example a display showing numbers of busy agents, free agents, customers held in queues, customers with mice positioned to call and customers looking at the company web page. Such information is of use to systems administrators.

As a customer clicks their mouse over the 'call me' button an applet will request a free agent from the ACD.

When a customer decides to call the call centre instead of making the call immediately, the caller may receive voice clips via the browser simulating an IVR (intelligent voice response) system at the call centre. Since the browser (for example by using CGI scripts and custom pages or by using an applet) is aware of the status of the Call Centre, in terms of queue lengths etc, the voice clips reflect what an IVR system would play in those circumstances if the call to the call centre had already been set up. as previously described the conventional 'press 1 for sales; 2 for marketing; 3. etc' dialogue is replaced with a GUI (graphic user interface) style options menu with point and click buttons. The caller may be presented with audio and visual images of the product/company while they wait. When an agent is available the call is finally set up. This may occur in either direction. Audio data may be downloaded to the client application when the relevant web page is first visited. This is appropriate, for example, for background music that is to be played to the user as they wait for an agent, and for a ring tone that is to be played to the customer when a call is initiated. Alternatively or in addition, other audio data is downloaded during the initial burst of ring tone as the call is initiated: this may be more appropriate for 'progress' type announcements. The audio clips may include, e.g., announcements that "you are no. x in the queue", where x is the position of the user in the queue. The applet may trigger the playing of the appropriate voice clip in response to control inputs from the ASC. Other audio or visual information, including menus requiring user input, may be presented to the user via the ASC/IP connection from the call centre both before, during and after the call. By playing audio clips of e.g. a ring tone and subsequent announcements, the application on the customer terminal simulates the existence of a call prior to the call in fact being established.

If the Call Centre only makes/receives calls from the internet there is no need for the centre to have a traditional IVR (intelligent voice response) system. There is also no need to have conventional queues of callers waiting to speak to an agent. As is further described below, callers queue before the call is made. If it is wished the caller may be asked if they would prefer to be called back, and if so could specify for example preferred times etc. on a web form. When a call is made, it may be made using internet telephony, or using the PSTN in the case of customers who have two telephone lines.

The implementation shown in FIG. 2 includes the following components:

| | |
|---|---|
| ACDi | Automatic Call Distribution Intelligence |
| ASC | Agent Session Component |
| JTAPI | Java Telephony Application Programming Interface |
| NM | NetMeeting |
| NMCC | NetMeetingCallComponent. |

Figure 5:
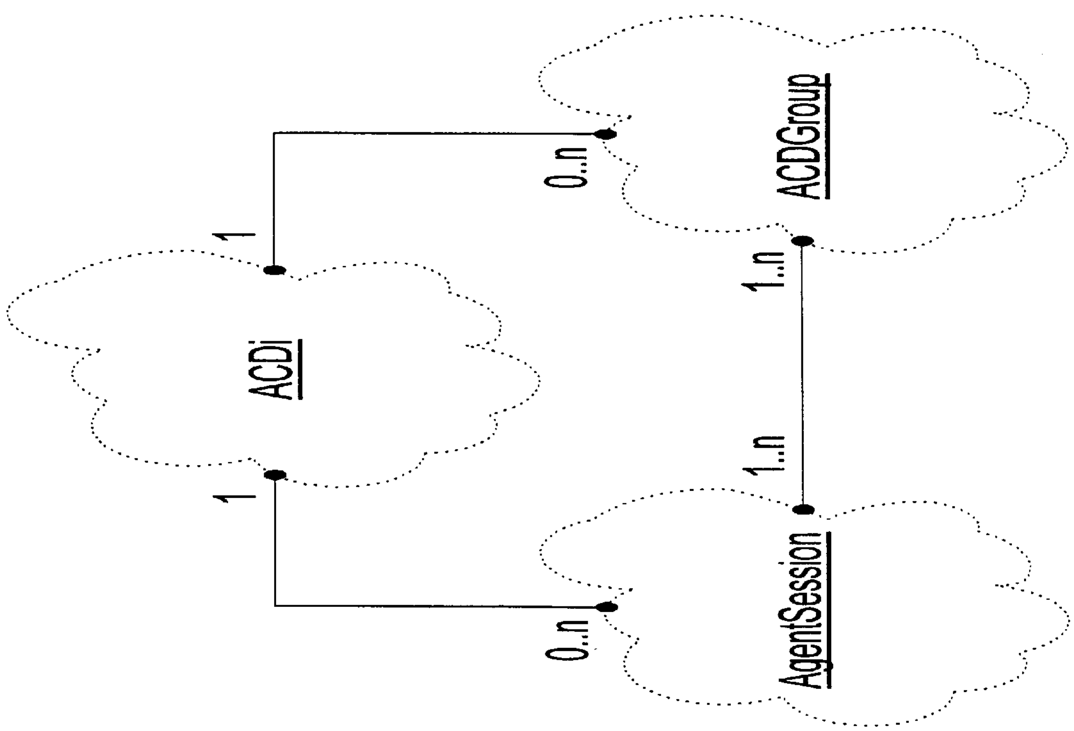
FIG. 5 is a diagram showing objects used in implementing the invention.
Figure 6:
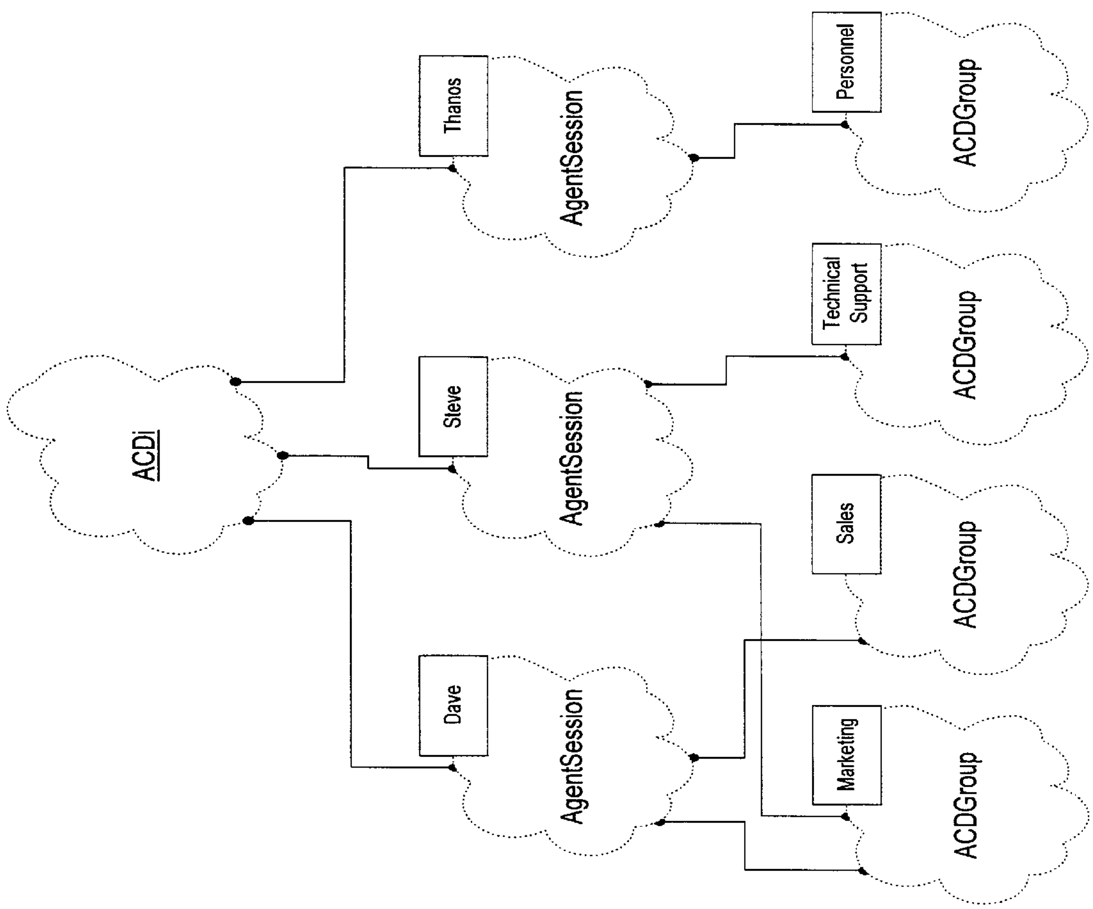
FIG. 6 shows instances of the objects of FIG. 5.
Figure 7A:
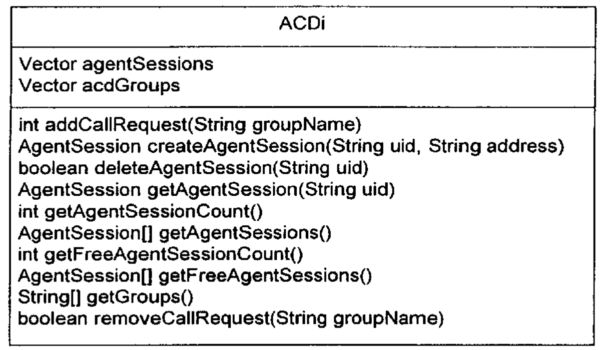
FIG. 7 shows definitions of the objects of FIGS. 5 and 6.
Figure 7B:
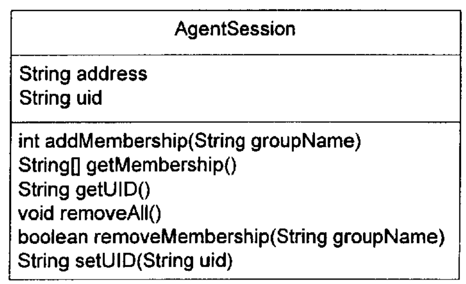
Figure 7C:
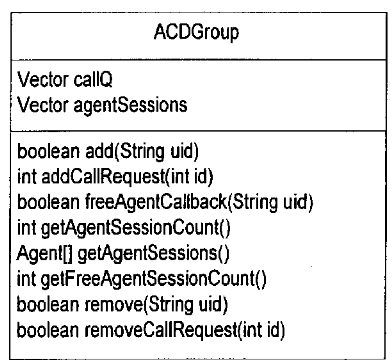

The relationship between the principle components, ACDi, Agent Session (ASC) and Agent Group is illustrated, using OOD (object oriented design) conventions in FIG. 5. FIG. 6 shows how these classes are instantiated during a particular session and FIGS. 7*a* to 7*b* show definitions of these classes. The ACDi object acts as the centre of control and maintains lists of all AgentSession and ACDGroup objects. It exports a CORBA interface to allow administration and utilisation of functionality. The Automatic Call Distribution Group (ACDGroup) represents a call group within the call centre. As such, it allows agents to become members and thereby service call requests applicable to that group. For example different groups might relate to sales or to technical support. Each ACDGroup maintains a list of registered AgentSession objects, representing agents that are members of that group. The AgentSession object represents an agent logged into the call centre. AgentSession objects are created when an agent logs in and removed when that agent logs out, giving the object a lifetime that corresponds to the log-in status of an agent. Each AgentSession object maintains a list of ACDGroup objects of which it is registered as a member.

In the example shown in FIG. 6, an agent, called Dave, is logged into the system and has an AgentSession object that represents him. Dave is registered as a member of the Marketing and Sales ACD Groups.

The ASC ascertains the availability of agents. It receives asynchronous notification when an agent's availability alters. As described above, the web user can initiate a call or receive a call back from an agent in appropriate call group. For example the customer may choose from groups corresponding to sales, order handling and invoicing. This menu of choices may be displayed to the user on the call centre web page. An applet, termed the "ASCENT" applet, at the customer terminal reflects the call request state visually and presents business specific information whilst waiting for a call to be established by a free agent making a return call to the user. The ASCENT applet may communicate with the local IP telephony, e.g. Net Meeting, client. The applet may reflect the call request state audibly by playing, e.g. ringing tones and status messages. In this way the applet simulates a call to the call centre, although the call only becomes a reality when an agent is free. In this way the invention reduces the media stream bandwidth into the call centre since the calls are not queued into the centre awaiting a free agent. Call centre speech processing and dialogue handling is moved to the client machine, reducing the cost to the call centre owner.

A software design implementing the invention will now be described in further details. The availability of agents registered with the application is made known to the ASC via the addition of an AvailabilityObserver on application. When an agent's availability alters, the method availabilityChanged( . . . ) is invoked against the AvailabilityObserver to notify the ASC and the ACD Intelligence (ACDi) The ASC may have access into the application via CORBA, whereby methods can be invoked across the network against remote objects. The application when used to implement the invention provides the methods specified below:

boolean addAvailabilityObserver(AvailabilityObserver ao)

Allow the ASC to add an observer to the application in order to receive asynchronous notification of agents' availability changes.

boolean removeAvailabilityObserver (AvailabilityObserver ao)

Allow the ASC to remove the observer previously added.

Agents[ ] getAgents( )

Allow the ASC to obtain a list of agents currently logged into application, including their availability and ACD groups.

String[ ] getACDGroups( )

Allow the ASC to obtain a list of the available ACD groups within the application.

boolean makeCall(Agent agent, String nmIP)

Allow the ASC to initiate a call, on behalf of the specified agent, to the specified NetMeeting IP address.

Agent Session Component (ASC)

The Agent Session Component (ASC) provides an API (application programmers interface) consisting of case-insensitive text-based messages. These are passed via a socket connection between the ASC and each Call Applet. The messages are listed below. Angled brackets denote parameters appropriate to the specified command.

Call Applet to ASC

[register, <nmIP>]

Used to register the Call Applet with the ASC, passing it the IP address of the machine on which the applet is running, subsequently used in all communication to unambiguously identify itself.

[deregister, <nmIP>]

Used to deregister the Call Applet with the ASC.

[callrequest, <nmIP>, <ACD group>]

Used when the Call Applet wishes to receive a call from an agent in the specified ACD group.

[getacdinfo, <nmIP>]

Returns the current state of the ACD groups, number of agents, busy/free status etc.

ASC to Call Applet

[requestqueued, <eturc>]

Used when the intended agent that will handle a specific call is busy, but will be free after an estimated time until return call <eturc>seconds.

[freeagent]

Sent when an appropriate agent's state has changed to free.

A scenario using the above design will now be described with reference to FIG. 4. The numbers in this description denote the steps shown in that Figure.

On the telephony platform the ASC, ACDi, and JTAPI are running. The ASC initialises by adding an AvailabilityObserver to the ACDi (1), and then obtains a list of agents currently registered (2). Whilst browsing the WWW, the Web User enters a URL that points to a HTML page containing the Java ASCENT applet. During initialisation, the ASCENT applet registers itself with the ASC (3), and proceeds to obtain a list of ACD groups and associated agents' states (4). This information is presented via a Graphical User Interface (GUI) and the Web User is to select an ACD group with which to place a call request.

Figure 4:
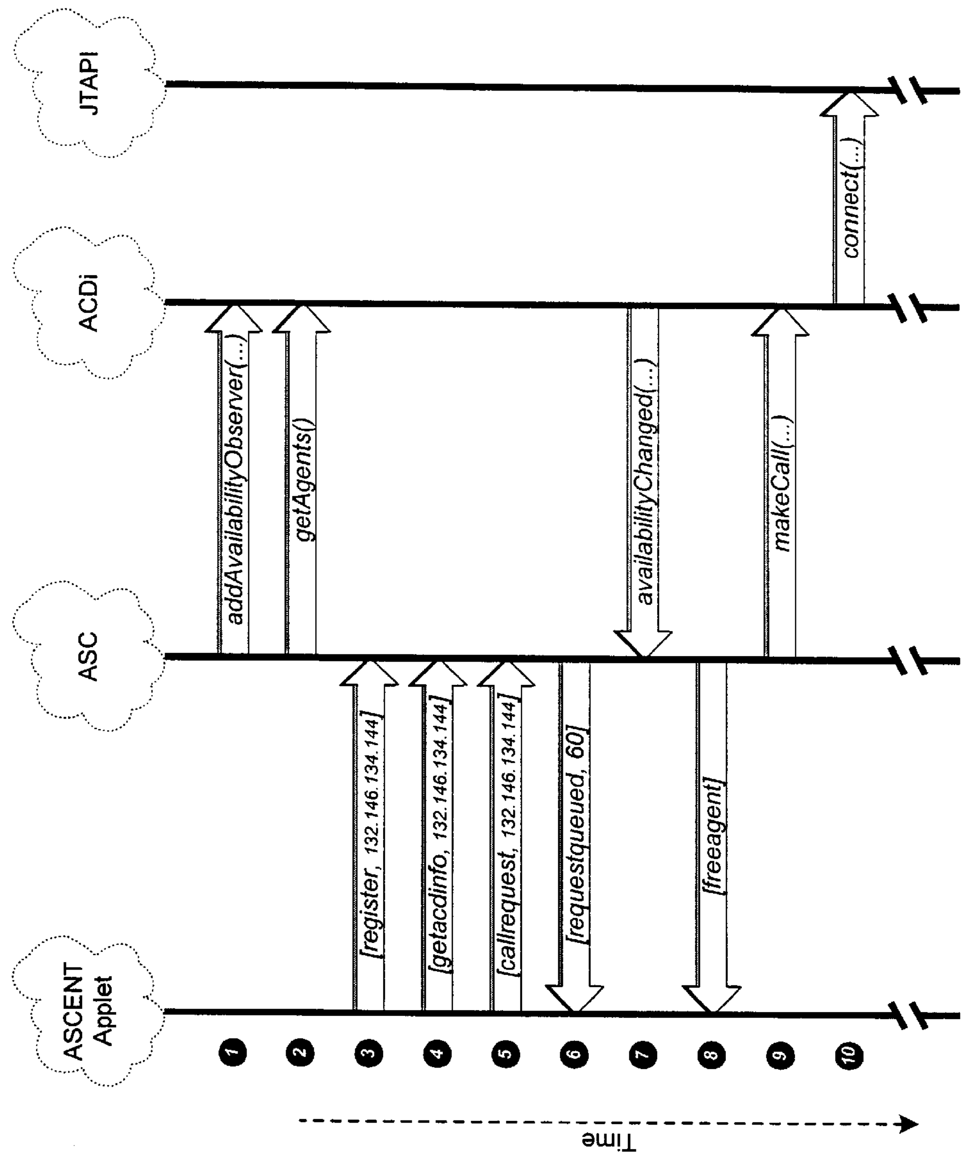
FIG. 4 shows the information flows in a system embodying the invention when an agent is busy.

It the scenario illustrated in FIG. 4, the ACD group with which the Web User has elected to place a call has no agents available at that time. The call request is queued at the ASC and a message is sent to the applet to that end, along with an estimated time until return call (eturc) (6). At this point, intelligence in-built in the applet deals with the situation and by playing audio status messages and giving visual information such as company history and product information. Via the AvailabilityObserver, a availabilitychanged( ) invocation is received by the ASC to indicate that an agent's state has changed (7). The agent that has become available is part of the ACD group that the applet placed a call request with and so the applet is informed that an agent is now free (8). The ASC then makes a call on the free agent's behalf (9), which subsequently initiates an IP telephony call using JTAPI (Java Telephony Application Programmers Interface) (10).

What is claimed is:

1. A method for setting up a voice call connection to an agent terminal within a call center from a user terminal remote from said call center, the method comprising:

transmitting from the call center to the user terminal agent data describing one or more agents and/or groups of agents associated with the call center and status data describing an availability status of said agents and/or groups of agents;

displaying, to a user of the user terminal, a list of the agents and/or groups of agents at the call center;

selecting an agent or group of agents from said transmitted one or more agents and/or group of agents in response to selection by a user;

transmitting status update messages from the call center to the user terminal;

playing audio clips to the user from audio data stored at the user terminal in response to said transmitted status update messages, said audio clips simulating the existence of a voice call connection, in the event that the selected agent or group of agents is indicated by said status data as busy; and subsequently initiating a voice call connection between the user terminal and a respective agent terminal associated with said selected agent or group of agents when the selected agent or group of agents becomes free.

2. A method according to claim 1 wherein the audio clips simulate a conventional voice call connection to an automatic call distribution system.

3. A method of setting up a voice call connection to one of a plurality of agent stations within a call center from a user station remote from said call center, via a telecommunications network, the method comprising:

transmitting from said call center to said user station status information indicative of agent station availability;

receiving a request at said user station from a user to set up a voice call to a specified agent station;

playing audio clips to the user from audio data stored at the user station in response to said transmitted status information, said audio clips simulating the existence of a voice call connection, in the event that the selected agent or group of agents is indicated by said status information as busy; and subsequently initiating a voice call connection between the user station and the specified agent station when said specified agent station becomes free.

4. A method according to claim 3 wherein the audio clips simulate a conventional voice call connection to an automatic call distribution system.

5. A telecommunications system comprising:

a call center;

at least one remote user terminal connected to said call center via a telecommunications network, said call center having a plurality of agent terminals connected to said telecommunications network;

storage means for storing agent data identifying one or more agents and/or groups of agents associated with the call center together with status data specifying the status of the or each agent and/or group of agents; and transceiver means for transmitting said agent data and said status data to said at least one user terminal and for receiving return data sent by said user terminal;

said at least one user terminal comprising:

transceiver means for receiving said agent data and said status data;

a user interface for displaying a list of agents and/or groups of agents based on said received agent and status data and for enabling a user of the user terminal to select one of said displayed agents and/or groups of agents and to select that a voice call connection should be set up from the user terminal to the selected agent and/or group of agents; and processing means for responding to user selections by playing audio clips to the user from audio data stored at the user terminal in response to said transmitted status update messages, said audio clips simulating the existence of a voice call connection prior to such a call being established while waiting until status data is received from the call center indicating that the selected agent and/or group of agents is free, and thereupon setting up a voice call connection between the user terminal and one of said agent terminals associated with the selected agent and/or group of agents.

6. A user terminal for initiating a call over a telecommunications system to an agent terminal within a call center, the user terminal comprising:

transceiver means for receiving from said call center agent data identifying one or more agents and/or groups of agents associated with the call center and status data specifying the status of the or each agent and/or group of agents;

a user interface for displaying a list of agents and/or groups of agents based on the received agent and status data and for enabling a user of the user terminal to select one of said displayed agents and/or groups of agents and to select that a voice call connection should be set up from the user terminal to the selected agent and/or group of agents; and processing means for responding to the user selections by playing audio clips to the user from audio data stored at the user terminal in response to said transmitted status update messages, said audio clips simulating the existence of a voice call connection prior to such a call being established while waiting until status data is received from the call center indicating that the selected agent and/or group of agents is free and thereupon setting up a voice call connection between the user terminal and one of said agent terminals associated with the selected agent and/or group of agents.

* * * * *